(12) United States Patent
Alanqar et al.

(10) Patent No.: US 7,154,900 B1
(45) Date of Patent: Dec. 26, 2006

(54) METHOD AND SYSTEM FOR ESTABLISHING A CROSS-CARRIER, MULTILAYER COMMUNICATIONS PATH

(75) Inventors: Wesam Alanqar, Kansas City, MO (US); Mark Loyd Jones, Overland Park, KS (US); Lynn Andrew Neir, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1080 days.

(21) Appl. No.: 10/217,917

(22) Filed: Aug. 13, 2002

(51) Int. Cl.
*H04L 12/56* (2006.01)
(52) U.S. Cl. .................. 370/401; 370/469; 370/395.41
(58) Field of Classification Search ............. 370/395.1, 370/395.41, 401, 402, 395.21, 395.6, 389, 370/386, 469
See application file for complete search history.

(56) References Cited

U.S. PATENT DOCUMENTS 6,563,793 B1 * 5/2003 Golden et al. ............. 370/236
6,661,803 B1 * 12/2003 Choi et al. .................. 370/413
2003/0093526 A1 * 5/2003 Nandagopalan et al. .... 709/225

OTHER PUBLICATIONS

"*Emperative Shows the Future of Intelligent Optical Networks*", Emperative, Inc., Press Release, Waltham, MA, Mar. 5, 2002, 2 pages.
"*Emperative Optical Solutions Overview*", Dec. 2001, 23 pages.
"*ProvEn Optical 2.0:F*", Failover, Emperative, Inc., 4 pages.
Glen Diener, "*Emperative ProvEn Optical, Architecture Overview*", CTO, 23, pages.
"*Emperative Unveils Meta-Control Plane Strategy*", Emperative, Inc., Press Release, Waltham, MA, Mar. 5, 2002, 2 pages.

* cited by examiner

*Primary Examiner*—Brenda Pham

(57) ABSTRACT

A method and system is provided for establishing a secure intercarrier, interlayer communications path that can allocate bandwidth on demand. Using the present invention, one network carrier uses the resources of another carrier to communicate with an otherwise unreachable target component. As bandwidth capacity is reached, the intercarrier connection can be dynamically migrated to a lower network layer. Transmissions of the upper layer are mapped into the lower layer to satisfy the additional bandwidth requested by the connection.

29 Claims, 8 Drawing Sheets

METHOD AND SYSTEM FOR ESTABLISHING A CROSS-CARRIER, MULTILAYER COMMUNICATIONS PATH

Not applicable.

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

Our invention is related to the field of telecommunications. More particularly, the field of the present invention deals with establishing a secure, cross-carrier, cross-layer, communications link.

BACKGROUND OF THE INVENTION

Telecommunications carriers provide access to communications networks Sprint Communications Company, L. P. of Overland Park, Kans. ("SPRINT") is one such public carrier. There are numerous public carriers all over the world, including for example, AT&T, British Telecom, Dutch Telecom, and France Telecom. Millions of customers can use a single public carrier. Governments and some enterprise companies have their own private networks. One such private networks is owned by the U.S. Navy (NAVY).

Cross-carrier communication, communication between carriers, is sometimes necessary. For instance, the NAVY may wish to establish a communications link from New York to California. If, however, the NAVY does not possess the resources to establish such a connection, then it may require the resources of another carrier to set up the connection. Given the current state of the art, automatically establishing such a cross-carrier communications link is problematic at best. Moreover, there is currently no way to automatically provide a cross-layer, cross-carrier, secure connection.

Although standards, when mature and accepted, can ease integration burdens, no widely-accepted standards exist to permit automatic cross-carrier, cross-layer communication. The Internet Engineering Task Force (IETF) has begun developing Generalized MultiProtocol Label Switching (GMPLS). GMPLS attempts to specify certain bridging-control protocols. GMPLS provides a unified bridging control for layered networks. Thus, generalized unified control messages can control several layers of network technologies ("layers".) Generally, a layer is a group of related functions that are performed in a given hierarchy level.

Certain cross-layer communications may be contemplated within the scope of GMPLS, limited to a single carrier. IETF is extending GMPLS to cover a cross-vendor, but single carrier environment. No current effort is being expended to extend GMPLS to be cross-carrier. GMPLS protocols can provide one of the protocol-specific implementations of the International Telecommunication Union (ITU) Automatically Switched Optical Network (ASON) generic architecture. Because neither GMPLS nor any other standard permits automatic cross-carrier communication, there is a need for a method and system for automatically communicating data across carriers and across layers.

Horizontal bridging, communicating between different domains or segments of a common layer of technology, is called Traffic Engineering. A domain is a grouping of network elements. Horizontal bridging refers to establishing a common-layer, multidomain, bridging control. Traffic engineering can be accomplished between packet layers, framing layers, or transport layers. Traffic engineering can be accomplished across vendor domains within the same carrier or can be done across multiple carriers. "Network Engineering," however, refers to vertical bridging between different layers of technologies. A common-layer, traffic-engineering bridging control can be extended to cover a multilayer, network-engineering bridging control.

Optimally, a cross-carrier connection will attempt to satisfy bandwidth demands of the user. As described herein, one method for allocating bandwidth on demand is to dynamically access different communications layers. For example, if the connection was established at a certain communications layer, but bandwidth demands saturate the layer, a need exists to provide a method and system for communicating data across layers within a cross-carrier connection.

Automatic cross-carrier, cross-layer communication is useful, but another important consideration when setting up such a connection involves security. In the scenario listed above, both SPRINT and the NAVY would appreciate the benefits afforded by a secure data connection. A secure connection provides network-connection isolation and data-transmission privacy. Isolation of network knowledge is an important feature. That is, each network should not have internal knowledge of the other network's operations, e.g., topology and resources. Accordingly, there is a need for a method and system for secure, automatic, cross-carrier communication. The methods and systems described herein contain enhanced features for security. The present invention provides a method and system for establishing secure, cross-carrier, cross-layer communications path.

SUMMARY OF THE INVENTION

The present invention solves at least the above problems by providing a system and method for automatically enabling cross-layer, cross-carrier communication between network elements in a communications network. The present invention adds a cross-carrier, secure connection aspect to an interlayer communication network to provide flexible bandwidth.

In one aspect of the invention, two carriers can interconnect through a single layer, such as the packet layer, to provide a carrier—carrier connection. More desirably, the present invention allows a flexible bandwidth upgrade by connecting the two carriers through multiple layers. For example, when the packet and framing layers of two carriers are connected, a variable bandwidth capability can be provided via the collaboration between traffic- and network-engineering functions.

Traffic engineering and network engineering collaborate together to satisfy new connection requests. Satisfying bandwidth requirements of existing connections, or those of new-connection requests, is initially fulfilled by traffic-engineering. The new demands are typically received in a certain layer. New bandwidth demands are generally attempted to be satisfied within that layer. For example, if new demands arise within a layer, traffic engineering will try to satisfy the new demands by intelligently moving connections across different paths within that layer to satisfy the new demands. If the new demands are not satisfied, network engineering in the layer where new demands arose will provision a connection in a lower layer. In other words, the lower layers are more aware of the upper-layer capacity requirements and there is more harmony between demand and capacity allocation. An example of the collaboration between network engineering of an upper layer and traffic engineering in a lower layer is provided in the following paragraph.

With reference by way of example to the packet layer and the framing layer, if there is not enough bandwidth in the packet layer to satisfy current demand, packet layer network engineering will contact the framing-layer traffic-engineering function to request a coarser connection. The coarser framing-layer connection can be used to aggregate multiple connections from the packet layer. Aggregation, however, is not necessary when creating an inter-layer communications path.

The same method can be applied to establishing other cross-layer paths. For example, if there is not enough bandwidth in the framing layer to satisfy current demands, the framing-layer network-engineering function will contact the transport-layer traffic-engineering function and request establishing a coarser connection in the transport layer. The coarser transport-layer connection can be used to aggregate multiple connections from the framing layer. Again, aggregation is not required. For example, an OC3 framing-layer connection can be migrated to an OC3 transport-layer connection.

Once the network-engineering function receives a request for a coarser connection in the lower layer, network engineering will contact the traffic-engineering function in the lower layer via its network-engineering-request-fulfillment component. A network-engineering-request-fulfillment component is a conventional element that aids in setting up, monitoring, and tearing down transmissions. When the lower-layer traffic-engineering function receives a connection request in the lower layer, the network-engineering function will provision the coarser connection and communicate back to the upper layer that the request is granted or denied. If the upper layer is granted a lower-layer coarser connection, the new demands in the upper layer are satisfied. If not, the original connection is maintained.

Thus, in one aspect of the invention, a method for establishing an intercarrier, interlayer connection is provided by receiving a request from a first carrier to communicate data to said second carrier; fulfilling the request via the second carrier in a first layer; and automatically allocating bandwidth from said second layer to said connection.

In another aspect of the invention, a system is provided for communicating data between two carriers that includes a carrier-to-carrier bridging control. The carrier-to-carrier bridging control provides a generic interface that allows cross-carrier, cross-layer data communication. The bridging control includes a network-engineering-request fulfillment-component for allowing interlayer communication; a traffic-engineering request-fulfillment component for satisfying a request from another carrier within the same layer of technology; and a bandwidth-allocation component for automatically allocating bandwidth from to the connection.

Additional aspects of the present invention will be realized in reviewing the foregoing disclosure.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1A:
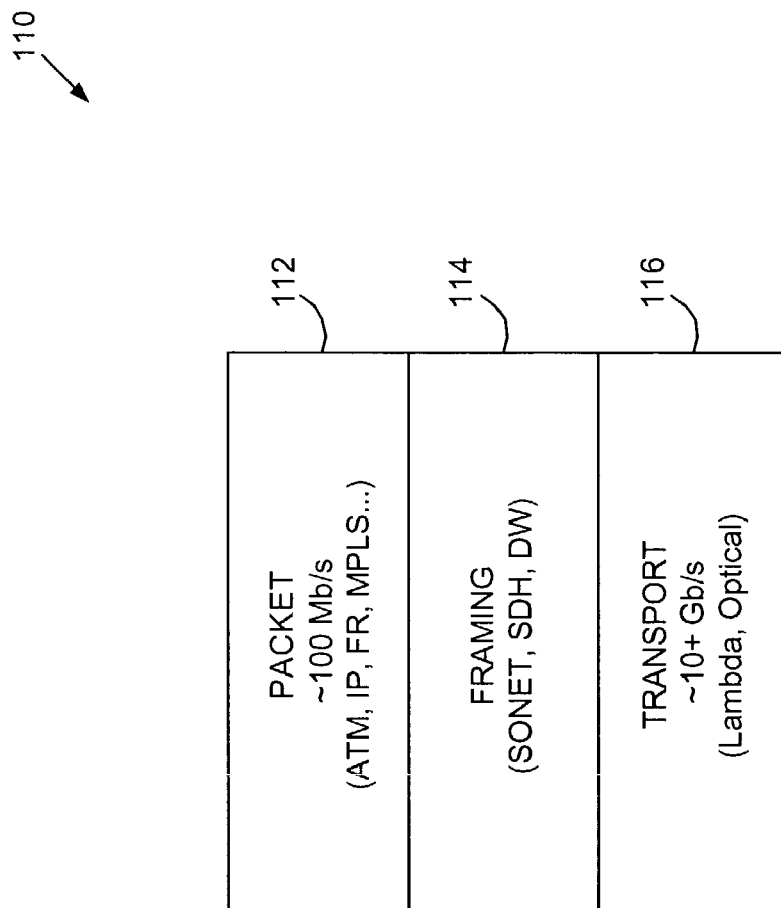
FIG. 1A is an illustration of three exemplary network communications layers.

The present invention provides a system and method for automatically establishing a secure intercarrier, interlayer communications path that can allocate bandwidth on demand. The present invention has several practical applications in the technical arts including enabling multiple carriers to access previously inaccessible target network devices and increasing the network efficiency across the various telecommunication domains.

Acronyms and Shorthand Notations

Throughout the disclosure of the instant invention, several acronyms and shorthand notations are used to help the reader understand certain concepts pertaining to the associated systems and methods. These acronyms and shorthand notations are intended solely for the purpose of providing an easy methodology of communicating the ideas expressed herein and are in no way meant to limit the scope of the present invention. The following is a list of these acronyms:

| Acronym | Full Phrase |
| --- | --- |
| ASON | Automatically Switched Optical Network |
| ATM | Asynchronous Transfer Mode |
| BCI | Bridge Control Interface |
| BC | Bridging Control |
| BCP | Bridging Control Plane |
| EMS | Element Management System |
| FR | Frame Relay |
| GigE | Gigabit Ethernet |
| IDF | Intermediate Distribution Frame |
| IP | Internet Protocol |
| ITU | International Telecommunication Union |
| ITU-T | The Telecommunications Standards Section (TSS) |
| MP | Management Plane |
| MPLS | MultiProtocol Label Switching |
| NE | Network Engineering |
| OSPF | Open Shortest Path First |
| OTN | Optical Transport Network |

-continued

| Acronym | Full Phrase |
|---|---|
| OSI | Open Systems Architecture |
| PNNI | Private Network-to-Network Bridging control |
| RSVP | The Resource Reservation Protocol |
| SDH | Synchronous Digital Hierarchy |
| SONET | Synchronous Optical NETwork |
| TE | Traffic Engineering |
| VPN | Virtual Private Network |

Further, various telecom technical terms are used throughout this disclosure. A definition of such terms can be found in: H. Newton, *Newton's Telecom Dictionary*, 18$^{th}$ Updated and Expanded Edition (2002). These definitions are intended for providing a clearer understanding of the ideas disclosed herein and are in no way intended to limit the scope of the present invention. The definitions and terms should be interpreted broadly and liberally to the extent allowed by the art and the meaning of the words offered in the above-cited reference.

The present invention will be described more fully with reference to the accompanying figures, in which various exemplary embodiments of the invention are shown. The present invention should not be construed as limited to the embodiments set forth. Rather, these embodiments are intended to be illustrative in nature and to convey the spirit of the invention.

As will be appreciated by one skilled in the art, the present invention may be embodied as, among other things, a method, a data-communications system, or computer program product. Accordingly, the present invention may take the form of a hardware embodiment, a software embodiment, or an embodiment combining software and hardware. The present invention may take the form of a computer-program product that includes computer-useable instructions embodied on a computer-readable medium.

Computer-readable media include both volatile and non-volatile media, removable and nonremovable media. By way of example, and not limitation, computer-readable media may comprise computer-storage media and communications media.

Computer-storage media includes both volatile and non-volatile, removable and nonremovable media implemented in any method or technology for storing information. Examples of stored information include computer-useable instructions, data structures, program modules, or other data. Computer-storage media include, but are not limited to, RAM, ROM, EEPROM, flash memory or other memory technology, CD-ROM, digital versatile disks (DVD), holographic media or other optical disk storage, magnetic cassettes, magnetic tape, magnetic disk storage, or other magnetic storage devices, or any other medium.

Communications media typically embody computer-readable instructions, data structures, program modules, or other data in a modulated data signal, such as a carrier wave or other transport mechanism. Communications media include any information-delivery media. The term "modulated data signal" means a propagated signal that has one or more of its characteristics set or changed in such a manner as to encode information in the signal. By way of example, and not limitation, communication media includes wired media, such as a wired network or direct-wired connection, and wireless media such as acoustic, infrared, radio, microwave, spread-spectrum, and other wireless media technologies. Combinations of any of the above are included within the scope of computer-readable media.

Establishing a Secure Cross-Carrier, Cross-Layer Communications Path

As previously mentioned, communications networks typically include multiple layers of network technologies ("layers".) Turning now to FIG. 1, an illustrative depiction of exemplary layers of a communications network is provided and referenced generally by the numeral 110. Exemplary layers 110 are but a small portion of the different communications layers and sublayers that exist.

Accordingly, FIG. 1 should not be interpreted to limit the scope of the present invention to the exemplary layers 110 shown. Rather, exemplary layers 110 are shown to aid in the description of embodiments of the invention. Those skill in the art will appreciate that other communications between other layers and sublayers, although not shown, are possible in light of the foregoing description.

The network can be decomposed into a number of layers with a client/server-type relationship between adjacent layers. Generally, a layer is a group of related functions that are performed in a given hierarchy plane. A network layer describes the generation, transmission, and termination of particular types of information. The network layers referred to herein should not be confused with the layers of the OSI Model (ITU-T X.200). An OSI layer offers a specific service using one protocol among different protocols. Here, however, each network layer represents a different layer of technology. As shown in FIG. 1, exemplary layers 110 include, but are not limited to, a packet layer 112, a framing layer 114, and a transport layer 116.

The packet layer 112 can include various technologies not limited to Asynchronous Transfer Mode (ATM), Internet Protocol (IP), Frame Relay (FR), and MultiProtocol Label Switching (MPLS) technologies. The framing layer can include various technologies not limited to Synchronous Optical NETwork (SONET), Synchronous Digital Hierarchy (SDH), and Digital Wrapper (ITU-T G.709) technologies. The transport layer can include various technologies not limited to lambdas and other optical technologies.

The client/server relationship between adjacent layer networks is one where a link connection in the client-layer network is supported by a trail in the server-layer network. An adaptation function generally describes how the client-layer network characteristic information is modified so that it can be transported over a trail in the server-layer network. From a layered network functional viewpoint, the adaptation function falls between the layers. The client/server relationship can be a one-to-one, many-to-one, or one-to-many relationship. In other words, when mapping a connection from an upper layer to a lower layer, signal aggregation is not necessary.

The one-to-one relationship represents the case of a single client-layer link connection supported by a single server-layer trail. An example of a one-to-one relationship is a single packet-layer connection mapped into a single framing-layer connection. The same applies for a single framing-layer connection mapped into a single transport-layer connection. An example of a many-to-one relationship is aggregating multiple packet-layer connections into a single framing-layer connection or mapping multiple framing-layer connections into a single transport-layer connection. The many-to-one relationship represents the case of several link connections of client-layer networks supported by one server-layer trail at the same time.

Multiplexing/aggregating techniques can be used to combine the client-layer signals. The client signals may be the same or different types. This means that different packet-layer technologies (IP, ATM, FR) can be mapped into framing-layer technologies (SONET/SDH, OTN, GigE). The same applies where different framing-layer technologies can be mapped to the transport layer 116 (lambda). The adaptation function may include specific processes for each client signal and common processes associated with the server-layer signal. The one-to-many relationship (inverse multiplexing) represents the case where a client-layer link connection is supported by several server-layer trails in parallel.

Inverse multiplexing techniques (e.g., ATM inverse multiplexing, virtual concatenation) are used to distribute the client-layer signal. The server signals can the same or different types.

Layers can also be roughly differentiated based on bandwidth. Generally, the lower the layer the coarser the bandwidth. That is, each lower layer manages larger data slices. For example, the packet layer 112 may operate at 100 Megabits per seconds while the transport layer may transmit optical wavelengths carrying 10 Gigabytes each. The higher the layer the smaller the data slices all the way to a voice circuit, for example, which carries only 64 kilobits per second.

When desirous, the present invention aggregates upper-layer signals into lower layers. For example, multiple packet-layer connections can be aggregated into one framing-layer connection, multiple framing-layer connections can be aggregated into one transport-layer connection, etc. This concept is also called "adaptation," referring to how to get information at one layer carried over another layer. Consider an everyday telephone conversation where people talk into the phone using an analog sound voice. "Adaptation" explains converting the analog voice into electrical data signals. Further, IP or ATM data packets may be encapsulated into a SONET frame. In sum, upper layers can be aggregated into lower layers.

Figure 1B:
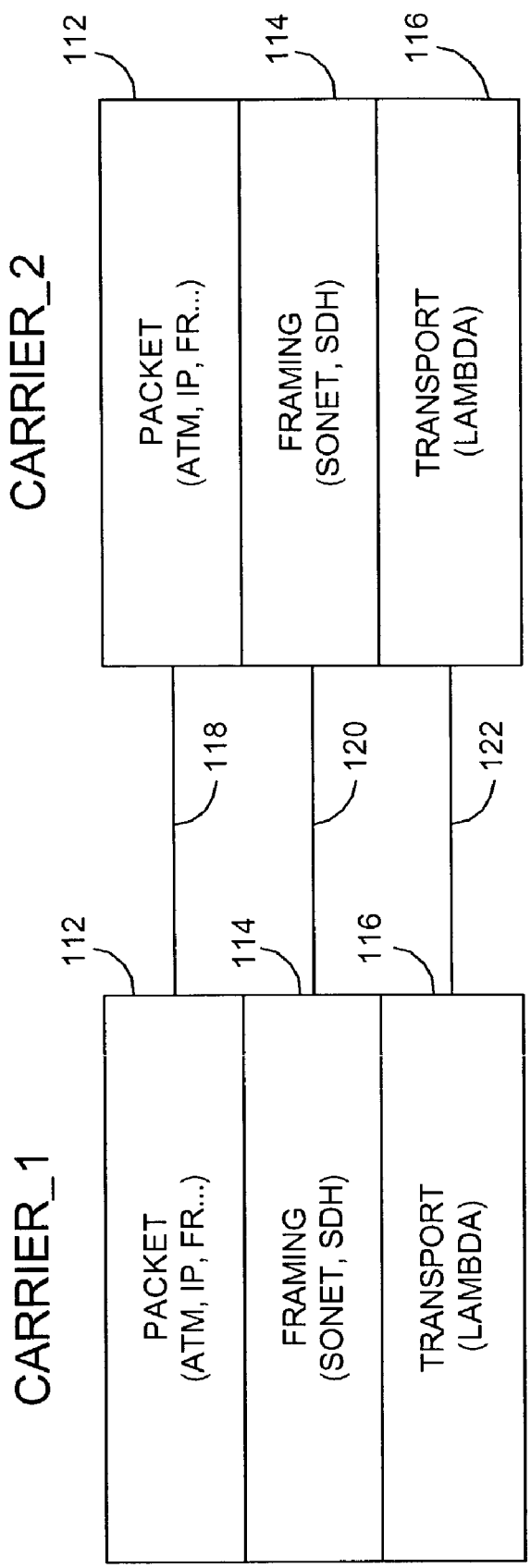
FIG. 1B is a block diagram illustrating one embodiment of logically coupling two communications carriers together.

Turning now to FIG. 1B a block diagram illustrating one embodiment of logically coupling two communications carriers together is provided. Carrier_1 is operationally coupled with Carrier_2 through multiple layers. The packet layers 112 are coupled though first link 118. The framing layers 114 are coupled though second link 120. The transport layers are coupled though third link 122. Coupling Carrier_1 and Carrier_2 though multiple layers allows interlayer communication between carriers. As will be explained, interlayer communication is one method for meeting the bandwidth demands of the connection.

Figure 1C:
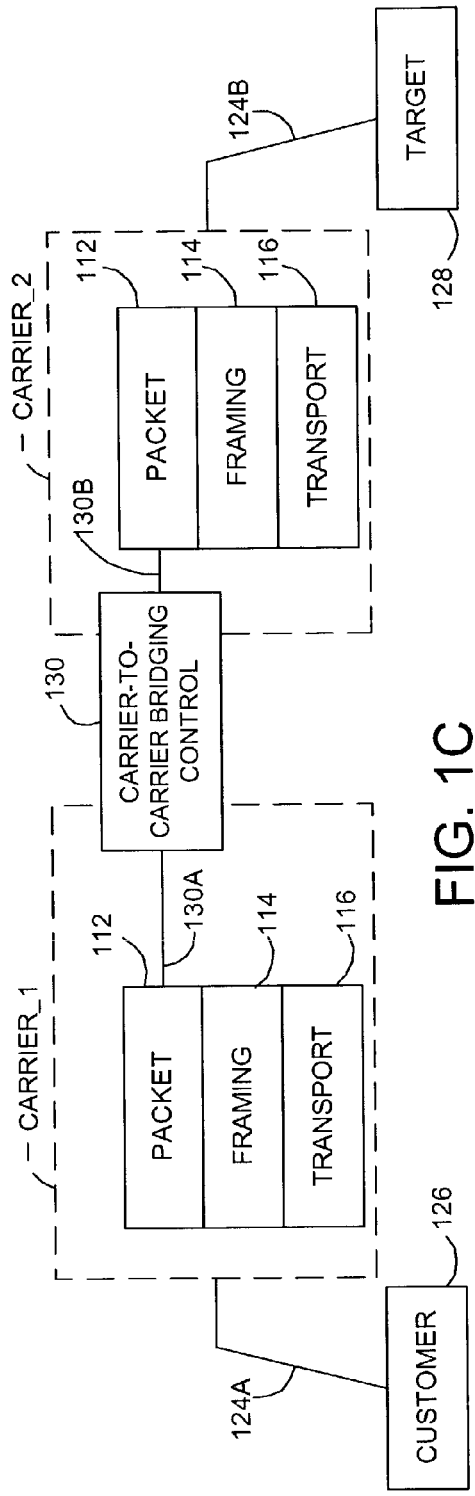
FIG. 1C is a block diagram of an exemplary connection through the packet layer.

Turning now to FIG. 1C, a block diagram of an exemplary connection through the packet layer is shown. The connection through the packet layer is merely an exemplary connection chosen to explain an embodiment of the present invention. The foregoing description is applicable to any connection established at a non-lowest communications layer. A first segment 124A represents a connection between a customer 126 and some target component 128. This connection could be any type of communication channel, wired or wireless. The exemplary connection could be a Virtual Private Network (VPN) connection, a telephone call, a secure broadband connection, etc, and terminates via a final segment 124B. A carrier-to-carrier bridging control 130 provides the capability for cross-carrier communication.

A bridging control 130 can replace most management plane functions while adding the ability to process calls. Generally, a bridging control 130 is a collection of controllers that are responsible for provisioning connections within a layer through call processing (signaling.) "Provisioning" involves supplying telecommunications service to a user including transmission, wiring, and equipment. Provisioning provides sufficient quantities of switching equipment to meet service standards.

Figure 1D:
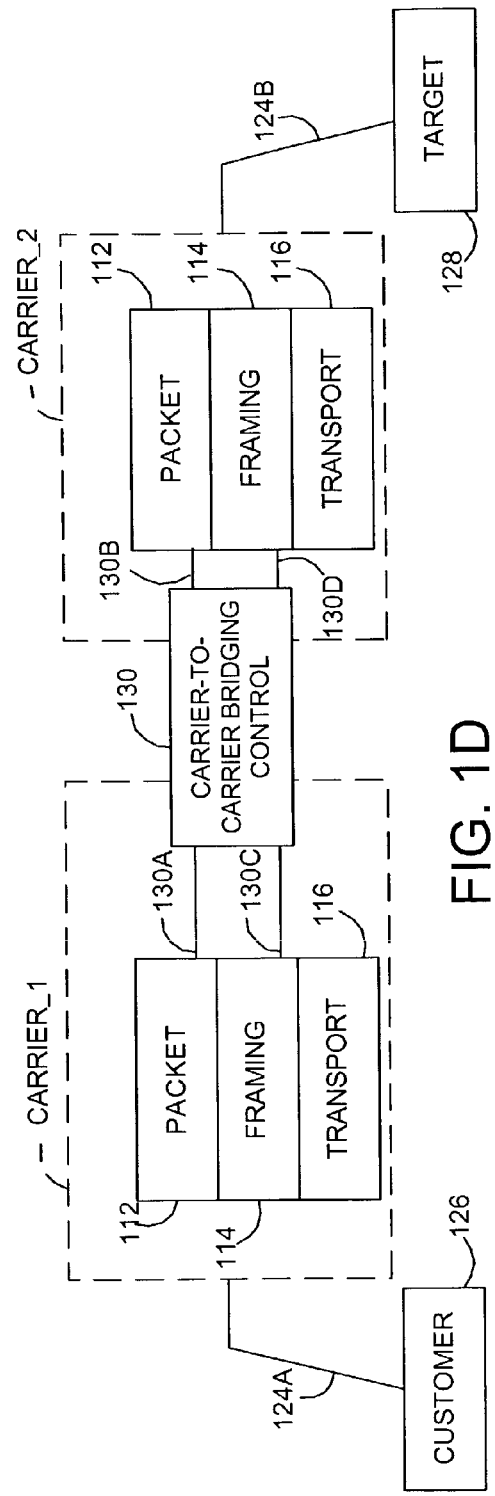
FIG. 1D is a block diagram of an exemplary connection through the packet and framing layers.

Bandwidth-demand in a layer can dynamically increase due to a multitude of factors. New connections may be requested or existing connections may require additional bandwidth. Bridging control 130 is coupled to the packet layer of Carrier_1 via first carrier link 130 and to Carrier_2 by second carrier ling 130B. If the bandwidth available in the packet layer 112 to satisfy the current demand reaches a threshold capacity, the new bandwidth requirement can be dynamically fulfilled by provisioning a parallel connection in the framing layer 114. As indicated in FIG. 1D, this parallel connection is comprised of a third carrier link 130C from the framing layer 114 of Carrier_1 and fourth carrier link 130D to the framing layer 114 of Carrier_2. Although only two examples were provided, a cross-carrier communication link can be established between any layer.

Figure 1E:
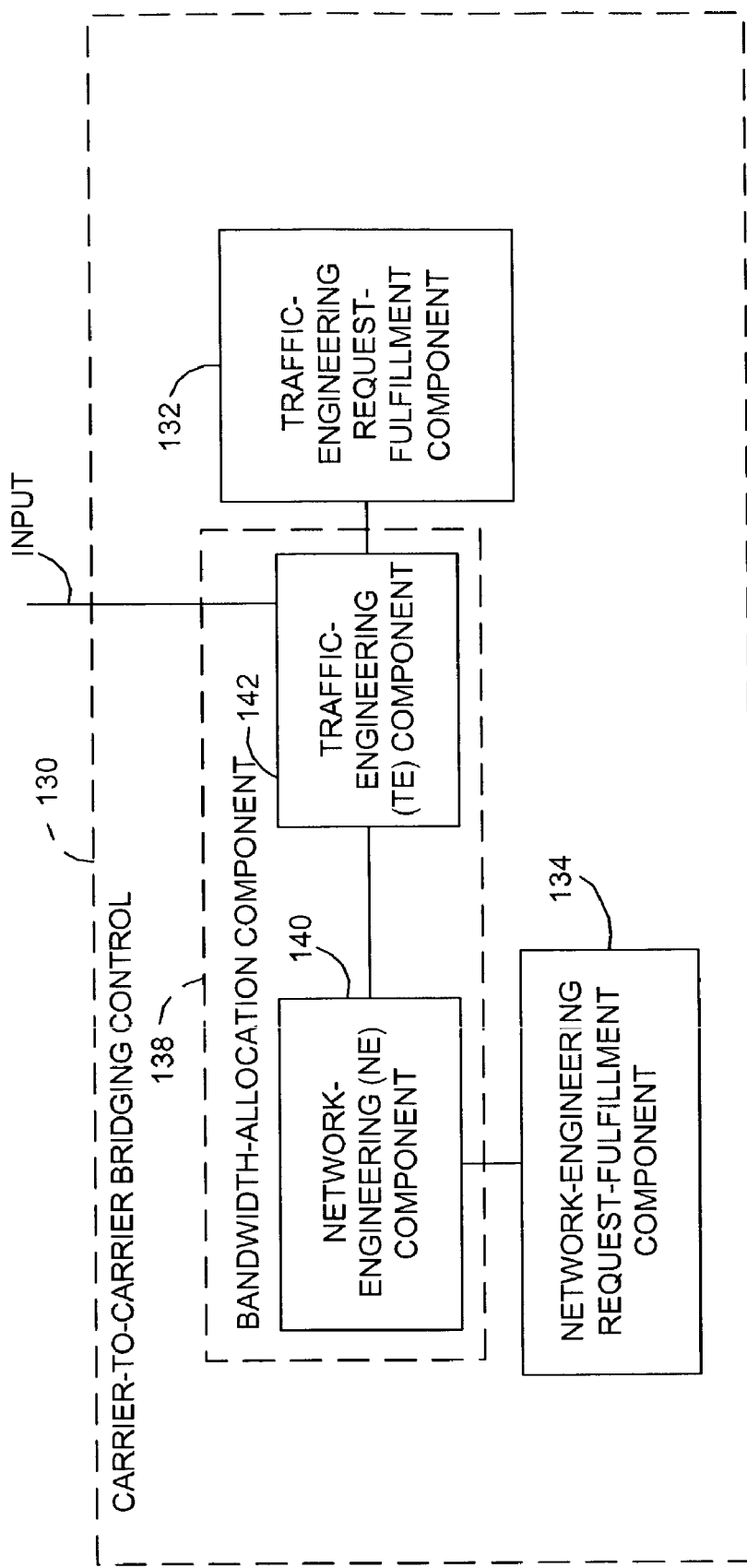
FIG. 1E is a block diagram of one embodiment of exemplary components within a carrier-to-carrier bridging control.

Turning now to FIG. 1E, a block diagram of one embodiment of exemplary components within a carrier-to-carrier bridging control 130 is provided. The carrier-to-carrier bridging control 130 can be embodied in hardware, software, or a combination of the two. The carrier-to-carrier bridging control 130 includes a first request-receiving component, which can be a traffic-engineering request-receiving component (TERFC) 132; a second request-fulfillment component, which can be a network-engineering request-receiving component (NERFC) 134; and a bandwidth-allocation component 138, which includes a network-engineering component 140 and a traffic-engineering component 142.

The TERFC 132 performs the function of receiving and fulfilling a traffic engineering request from a first carrier to communicate data through a second carrier within the same layer of technology. The NERFC 134 performs the function of receiving and fulfilling a network engineering request from an upper layer to the same carrier lower layer. Finally, a bandwidth-allocation component 140 automatically allocates bandwidth to the connection when a threshold capacity is reached. When a coarser connection is requested, both carriers employ a respective NERFC 134. In other words, both carriers perform network engineering to provision a lower-layer connection.

Figure 1F:
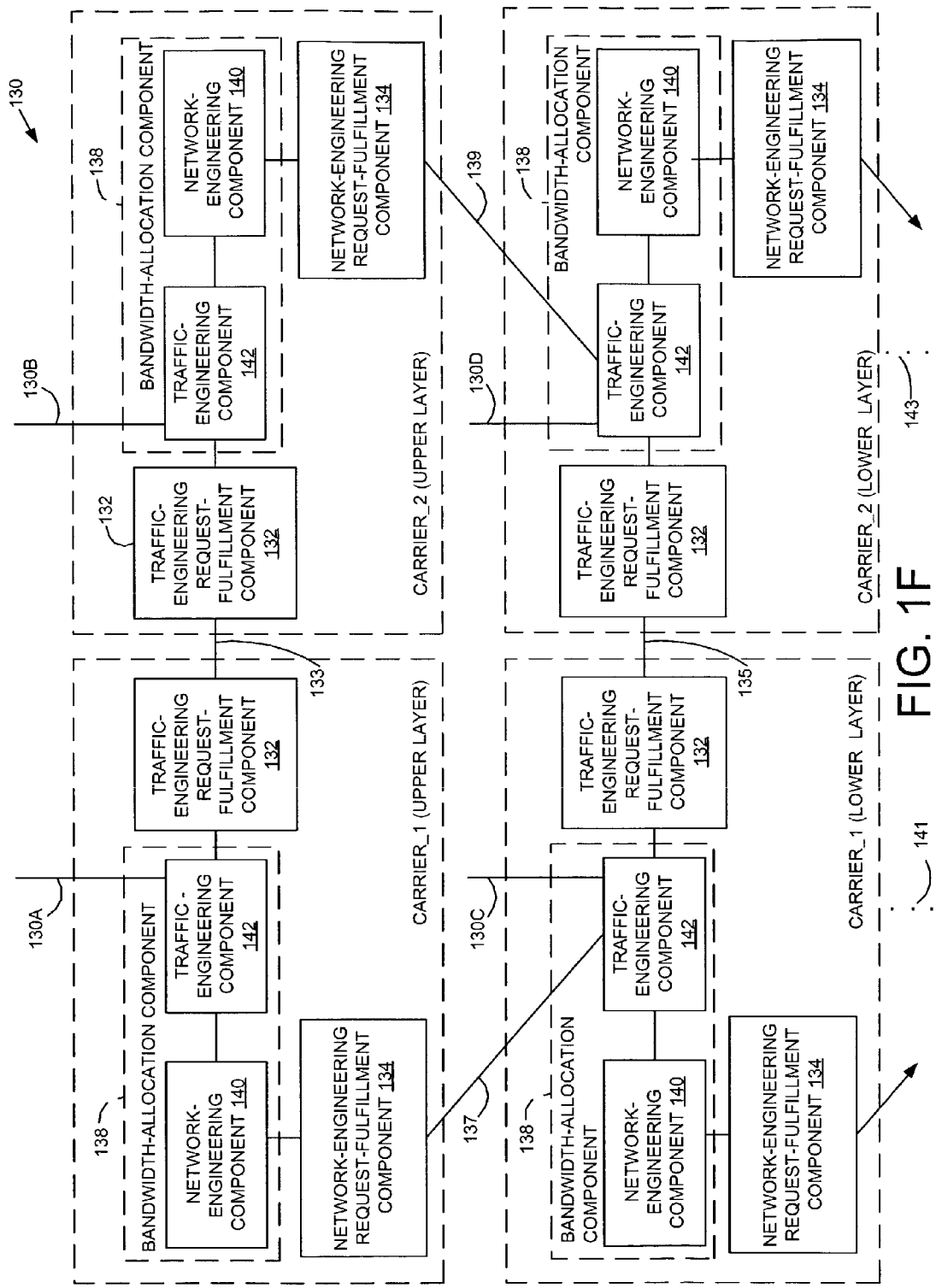
FIG. 1F is a block diagram that illustrates how the bridging control components can be logically arranged to allow cross-layer, cross-carrier communication.

FIG. 1F provides an illustration of how the logical elements of bridging control 130 are implemented to facilitate a cross-carrier, cross-layer communications path. An upper-layer TERFC 132 of Carrier_1 is coupled to an upper-layer TERFC 132 of Carrier_2 by communications link 133. Similarly, a lower-layer TERFC 132 of Carrier_1 is coupled to a lower-layer TERFC 132 of Carrier_2 by communications link 135.

An upper-layer NERFC 134 of Carrier_1 is coupled to a lower-layer traffic engineering component 142 of the same carrier by communications link 137. Similarly, an upper-layer NERFC 134 of Carrier_2 is coupled to a lower-layer traffic engineering component 142 of the same carrier by communications link 139. Communications links 139 and 137 provided interlayer communication. With all of the communications links, 133, 135, 137, and 139, a secure cross-carrier, cross-layer communications path can be established. As indicated by first ellipsis 141 and second ellipsis 143, multiple layers and carriers can be connected in a similar fashion. A generic interface is provided by input segments 130A, 130B, 130C, and 130D.

Figure 2A:
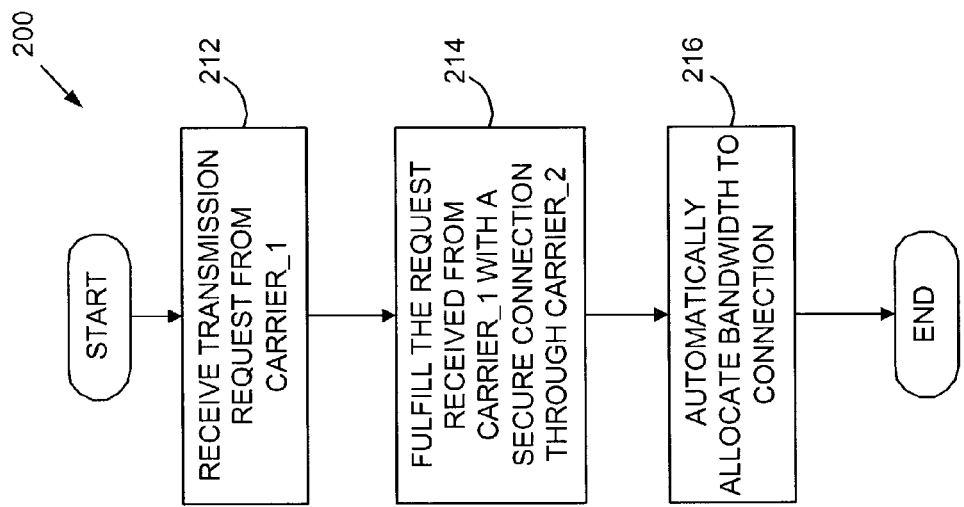
FIG. 2A depicts an overview of an exemplary process for intercarrier, interlayer communication.
Figure 2B:
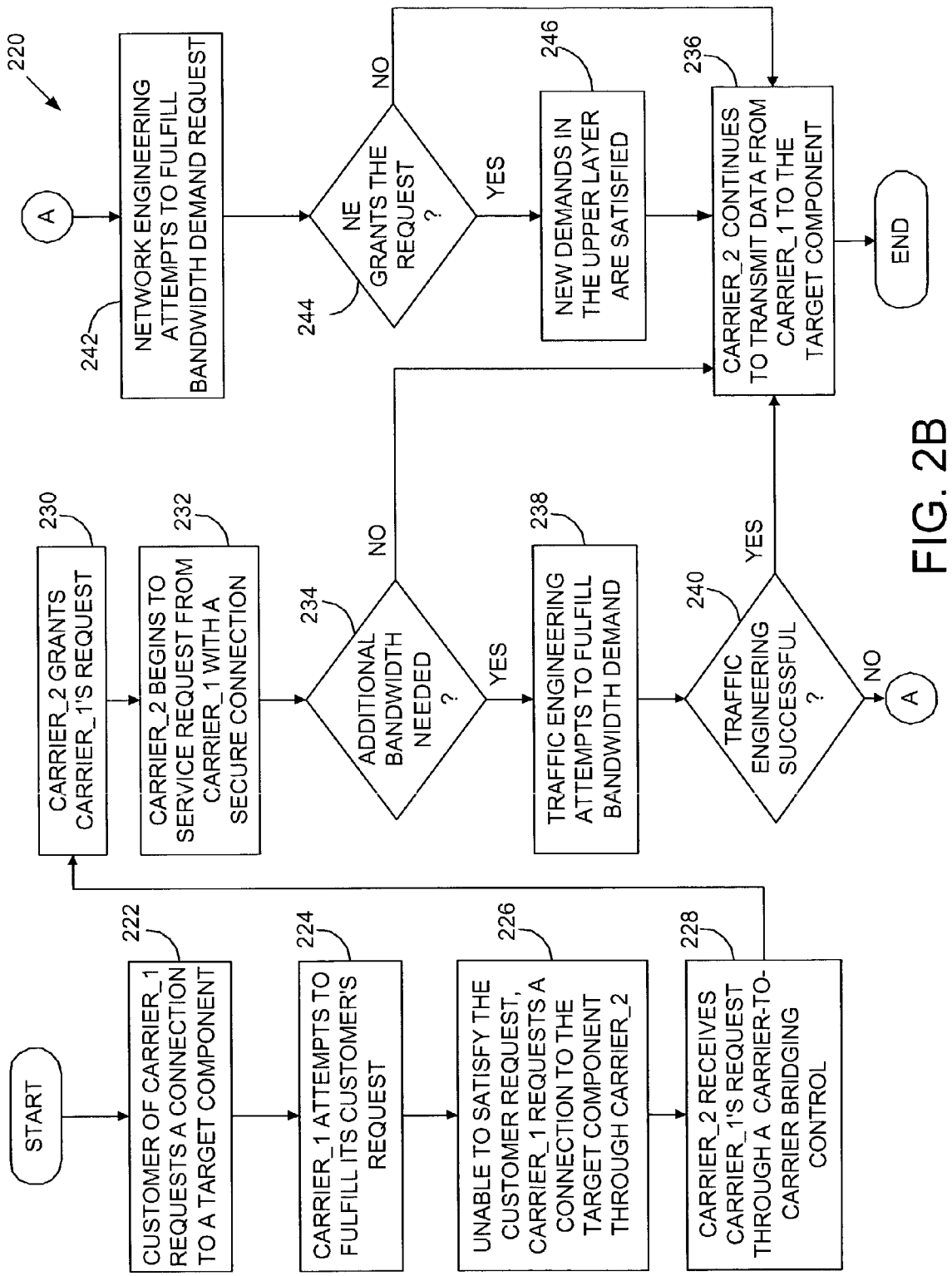
FIG. 2B depicts in the process of FIG. 2A greater detail.

Turning now to FIG. 2A, an overview of a process for secure intercarrier, interlayer communication path is referenced generally by numeral 210. At a step 212, a transmission request from Carrier_1 is received. At a step 214, the request from Carrier_1 is fulfilled with a secure connection through Carrier_2. As needed, the bandwidth is automatically allocated to connection at a step 216. A more detailed process flow is provided in FIG. 2B. Coupling the TERFCs 132 enables cross-carrier communication. Turning now to FIG. 2B, a more detailed process for secure intercarrier, interlayer communication is referenced generally by the numeral 220. At a step 222, customer 126 of Carrier_1 requests a connection to target component 128, which could be a customer. Carrier_1 attempts to fulfill its customer's request at a step 224. For a variety of reasons Carrier_1 may not be able to service the request of customer 126. Carrier_1 may lack a long-haul connection to the customer. Accordingly, Carrier_1 requests a connection to target component 128 at step 226. Carrier_2 receives the request of Carrier_1 though carrier-to-carrier bridging control 130 at a step 230. Carrier_2 grants the request at a step 232. At a step 232, Carrier_2 begins to service the request from Carrier_1 with a secure connection.

At a step 234, a determination is made as to whether additional bandwidth is needed. If no additional bandwidth is needed, Carrier_2 continues to transmit data from Carrier_1 to the target component at a step 236. If more bandwidth is needed, then TERFC 132 attempts to dynamically fulfill the new demand in step 238. In a preferred embodiment, the new demand fulfillment is initially achieved in the same layer it originates. If no capacity is available in the original layer, however, the two carriers migrate the connection to a lower network layer.

A determination is then made as to whether traffic engineering was successful at a step 240. If so, Carrier_2 continues to transmit the data from Carrier_1 to the target component at step 236. If however traffic engineering was not successful then network engineering attempts to fulfill the bandwidth demand request at a step 242. Step 242 will be explained in greater detail with respect to FIG. 2C, where network engineering attempts to fulfill the request by migrating the connection to a lower network layer. But before reaching FIG. 2C, the process continues. Network engineering will either grant or deny the demand request at a step 244. If network engineering grants the request, then the new demands in the upper layer will be satisfied by aggregating bandwidth into a lower layer at a step 246 in a preferred embodiment. Migrating the connection to a lower can be accomplished in a variety of ways. Carrier_2 will continue transmitting data from Carrier_1 to the target component at a lower layer at step 236. If the request is not granted, Carrier_2 will continue transmitting data from Carrier_1 to the target component within the same layer without granting additional bandwidth requests, having not migrated the connection to a lower layer.

Figure 2C:
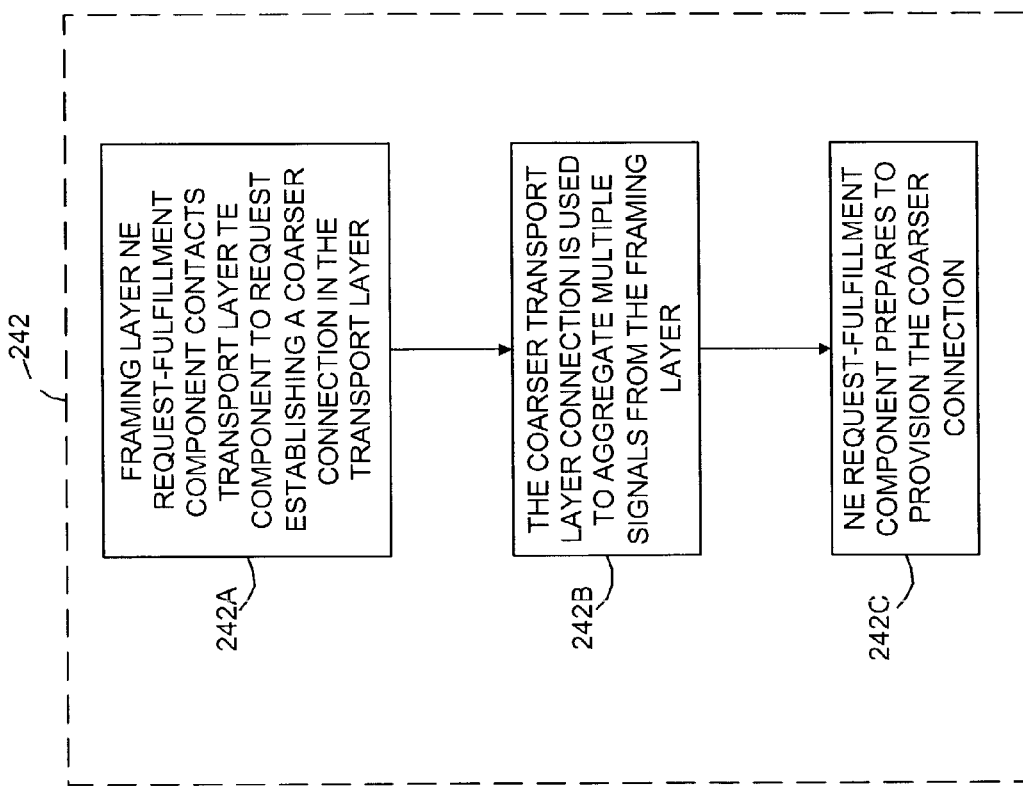
FIG. 2C depicts a preferred method for implementing the step of dynamically migrating a connection to a lower network layer.

Turning now to FIG. 2C the process of attempting to migrate a connection to a lower layer is illustrated in greater detail. FIG. 2C provides an illustrative example of migrating a connection from the framing layer 114 to the transport layer 116. FIG. 2C is not intended to limit the scope of the present invention. Those of ordinary skill in the art will readily appreciate that the process illustrated by FIG. 2C in conjunction with FIG. 2B can be applied to migrate a connection from any upper layer to a lower layer. Providing a specific example here adds to clarity.

Accordingly, with reference to a specific example, the framing layer network engineering component 140 (see FIG. 1F) contacts the lower transport layer traffic engineering component 142 (see FIG. 1F) to request establishing a coarser connection in the transport layer at a step 242A. The coarser transport-layer connection is used to aggregate multiple signals from the framing layer at a step 242B. Finally the network engineering request fulfillment component 134 (see FIG. 1F) prepares to provision the coarser connection at a step 242C. The process continues as previously described when network engineering determines whether to grant the request at step 244.

As can be seen, the present invention and any equivalent is well adapted to provide a secure intercarrier, inter layer communications path that can allocate bandwidth on demand. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments that the present invention pertains without departing from its scope will become apparent to those skilled in the art.

It will be understood that certain features and subcombinations are of utility and may be employed without reference to other features and subcombinations and are contemplated within the scope of the claims. Not all steps listed in the various figures need be carried out in the specific order described, nor are the various connections shown intended to implicate that only those devices directly connected can communicate with each other.

What the invention claimed is:

1. A method for establishing an intercarrier, interlayer communications path between a first carrier, having a first network domain, and a second carrier, having a second carrier network domain, said method comprising the steps of:
   receiving a request from said first carrier to communicate data to said second carrier;
   fulfilling said request via said second carrier in said first layer; and
   automatically allocating bandwidth from said second layer to said connection;
   wherein said fulfilling said request includes:
   providing a carrier-to-carrier bridging control;
   providing for the transmission of said data via said second carrier across said second carrier network domain, whereby said data is communicated from said first carrier through said second carrier by passing through said carrier-to-carrier bridging control.

2. The method of claim 1, wherein establishing said connection includes establishing a secure connection.

3. The method of claim 2, wherein said secure connection is an isolated connection.

4. The method of claim 3, wherein automatically allocating bandwidth from said second layer to said connection includes aggregating a plurality of first-layer signals into one or more second-layer signals.

5. The method of claim 4, wherein aggregating said plurality of first-layer signals includes a selection from the group comprising:
   mapping one or more packet-layer transmissions into a framing-layer transmission; and
   mapping one or more framing-layer transmission into a transport-layer transmission.

6. The method of claim 5, where said framing-layer technologies includes a selection from the group comprising Synchronous Optical NETwork (SONET), Synchronous Digital Hierarchy (SDH), Digital Wrapper, Optical Transport Network (OTN), and Gigabit Ethernet (GigE).

7. The method of claim 6, where said packet-layer technologies include a selection from the group comprising Asynchronous Transfer Mode (ATM), Internet Protocol (IP), Frame Relay (FR), and MultiProtocol Label Switching (MPLS) technologies.

8. The method of claim 7, wherein aggregating said plurality of signals includes mapping one or more framing-layer technologies into a transport layer technology.

9. The method of claim 8, where said transport-layer technologies include lambdas.

10. A tangible computer-readable medium having computer-useable instructions embodied thereon, that when executed cause a method for establishing an intercarrier, interlayer communications path between a first carrier, having a first network domain, and a second carrier, having a second carrier network domain, said method comprising the steps of:
fulfilling a request received from said first carrier to communicate data via said second carrier in said first layer; and
providing for the automatic allocation of bandwidth from said second layer to said connection;
wherein said fulfilling said request includes:
providing a carrier-to-carrier bridging control; and
providing for the transmission of said data via said second carrier across said second carrier network domain, whereby said data is communicated from said first carrier through said second carrier by passing through said carrier-to-carrier bridging control.

11. The computer-readable medium of claim 10, wherein communicating said data includes communicating said data via a secure connection.

12. The computer-readable medium of claim 11, wherein said secure connection is an isolated connection.

13. The computer-readable medium of claim 12, wherein automatically allocating bandwidth from said second layer to said connection includes aggregating a plurality of first-layer signals into one or more second-layer signals.

14. The computer-readable medium of claim 13, wherein aggregating said plurality of first-layer signals includes a selection from the group comprising:
mapping one or more packet-layer transmissions into a framing-layer transmission; and
mapping one or more framing-layer transmission into a transport-layer transmission.

15. The computer-readable medium of claim 14, where said framing-layer technologies includes a selection from the group comprising Synchronous Optical NETwork (SONET), Synchronous Digital Hierarchy (SDH), Digital Wrapper, Optical Transport Network (OTN), and Gigabit Ethernet (GigE).

16. The computer-readable medium of claim 15, where said packet layer technologies include a selection from the group comprising Asynchronous Transfer Mode (ATM), Internet Protocol (IP), Frame Relay (FR), and MultiProtocol Label Switching (MPLS) technologies.

17. The computer-readable medium of claim 16, where said transport-layer technologies include lambdas.

18. A system for communicating data through a communications carrier network domain, comprising a carrier-to-carrier bridging control for establishing a data connection through said network domain;
wherein said carrier-to-carrier bridging control includes:
a first request-fulfillment component for facilitating intralayer communication;
a second request-fulfillment component for facilitating intracarrier communication; and
a bandwidth-allocation component logically coupled to said first and second request-fulfillment components for automatically allocating cross-carrier bandwidth from a first layer to a second layer of a network domain.

19. The system of claim 18, wherein said data connection includes a secure connection.

20. The system of claim 19, wherein said first request-fulfillment component is a traffic engineering request-fulfillment component.

21. The system of claim 20, wherein said second request-fulfillment component is a network engineering request-fulfillment component.

22. The system of claim 18, wherein said secure connection is an isolated connection.

23. The system of claim 22, wherein said bandwidth-allocation component comprises a network-engineering component.

24. The system of claim 23, wherein said bandwidth-allocation component further comprises a traffic-engineering component.

25. The system of claim 22, wherein said bandwidth-allocation component is adapted to aggregate a plurality of first-layer signals into one or more second-layer signals.

26. The system of claim 25, wherein
said first-layer signals include a selection from the group comprising Asynchronous Transfer Mode (ATM), Internet Protocol (IP), Frame Relay (FR), and Multi-Protocol Label Switching (MPLS) technologies; and
said second-layer signals include a selection from the group comprising Synchronous Optical NETwork (SONET), Synchronous Digital Hierarchy (SDH), Digital Wrapper, Optical Transport Network (OTN), and Gigabit Ethernet (GigE).

27. The system of claim 26, wherein
said first-layer signals include a selection from the group comprising Synchronous Optical NETwork (SONET), Synchronous Digital Hierarchy (SDH), Digital Wrapper (ITU-T G.709), Optical Transport Network (OTN), and Gigabit Ethernet (GigE); and
said second-layer technologies include lambdas.

28. A system for establishing an intercarrier, interlayer communications path between a first network carrier and a second carrier, said method comprising the steps of:
request-receiving means for receiving a request from said first carrier to communicate data to said second carrier via a data communications path;
a request-fulfillment means, logically coupled to said request-receiving means, for satisfying said request; and
a bandwidth-allocation means, logically coupled to said request-fulfillment means, for automatically allocating bandwidth to said first and second carriers;
wherein said fulfilling said request includes:
providing a carrier-to-carrier bridging control;
providing for the transmission of said data via said second carrier across said second carrier network domain, whereby said data is communicated from said first carrier through said second carrier by passing through said carrier-to-carrier bridging control.

29. The system of claim 28, wherein said data communications path is a secure path.

* * * * *